US011727092B2

(12) United States Patent
Cedernaes et al.

(10) Patent No.: US 11,727,092 B2
(45) Date of Patent: Aug. 15, 2023

(54) METHOD, SOFTWARE PRODUCT, DEVICE AND SYSTEM FOR INTEGRATING IMAGES

(71) Applicant: SAAB AB, Linköping (SE)

(72) Inventors: Erasmus Cedernaes, Sundbyberg (SE); Joakim Lindén, Täby (SE)

(73) Assignee: SAAB AB, Linköping (SE)

( * ) Notice: Subject to any disclaimer, the term of this patent is extended or adjusted under 35 U.S.C. 154(b) by 113 days.

(21) Appl. No.: 17/297,694

(22) PCT Filed: Nov. 28, 2018

(86) PCT No.: PCT/SE2018/051225
§ 371 (c)(1),
(2) Date: May 27, 2021

(87) PCT Pub. No.: WO2020/111990
PCT Pub. Date: Jun. 4, 2020

(65) Prior Publication Data
US 2022/0027683 A1      Jan. 27, 2022

(51) Int. Cl.
*G06F 18/25*      (2023.01)
*G06V 10/10*      (2022.01)
*G06V 20/13*      (2022.01)

(52) U.S. Cl.
CPC ............. *G06F 18/25* (2023.01); *G06V 10/10* (2022.01); *G06V 20/13* (2022.01); *G06V 10/16* (2022.01)

(58) Field of Classification Search
CPC ...... G06K 9/6288; G06V 10/10; G06V 20/13; G06V 10/16
See application file for complete search history.

(56) References Cited

U.S. PATENT DOCUMENTS

| | | |
|---|---|---|
| 2004/0047518 A1 | 3/2004 | Tiana |
| 2005/0232512 A1 | 10/2005 | Luk et al. |
| 2005/0270784 A1 | 12/2005 | Hahn et al. |
| 2007/0242900 A1* | 10/2007 | Chen ...................... H04N 5/235 382/294 |
| 2010/0017047 A1 | 1/2010 | Sanders-Reed |

(Continued)

OTHER PUBLICATIONS

Wang, X., Nie, R., & Guo, X. (Mar. 2018). Two-scale image fusion of visible and infrared images using guided filter. In Proceedings of the 7th International Conference on Informatics, Environment, Energy and Applications (pp. 217-221). (Year: 2018).*

(Continued)

*Primary Examiner* — David Perlman
(74) *Attorney, Agent, or Firm* — Sage Patent Group (57) ABSTRACT

The invention relates to a method for image integration (100), said method comprising the steps of acquiring at least two overlapping images (110) having different properties, and forming at least one integrated image (170) based on the overlapping images (110), wherein the step of forming at least one integrated image (170) comprises generating at least one score map (130) for each acquired overlapping image (110) relating to locally salient features of said overlapping image (110), forming an integration map (150) based on the at least one score map (130) of the at least two overlapping images (110), and integrating the at least two overlapping images (110) based on the integration map (150) to form an integrated image (170).

20 Claims, 5 Drawing Sheets

(56) References Cited

U.S. PATENT DOCUMENTS

| | | | |
|---|---|---|---|
| 2010/0322521 A1* | 12/2010 | Tal | G06T 11/60 |
| | | | 382/199 |
| 2011/0227944 A1 | 9/2011 | Feyereisen et al. | |
| 2015/0030242 A1 | 1/2015 | Shen | |
| 2017/0187943 A1 | 6/2017 | Tsuyuki et al. | |
| 2019/0108622 A1* | 4/2019 | Douady-Pleven | G06T 5/50 |
| 2020/0385014 A1* | 12/2020 | Hanniel | B60W 60/001 |

OTHER PUBLICATIONS

Bavirisetti, D. P., & Dhuli, R. (2016). Two-scale image fusion of visible and infrared images using saliency detection. Infrared Physics & Technology, 76, 52-64. (Year: 2016).*

Gan, W., Wu, X., Wu, W., Yang, X., Ren, C., He, X., & Liu, K. (2015). Infrared and visible image fusion with the use of multi-scale edge-preserving decomposition and guided image filter. Infrared Physics & Technology, 72, 37-51. (Year: 2015).*

International Preliminary Report on Patentability dated Nov. 19, 2020 for International Patent Application No. PCT/SE2018/051225, 19 pages.

Wang, Chao et al.; "Salience Preserving Image Fusion with Dynamic Range Compression", 2006 IEEE International Conference on Image Processing, Oct. 1, 2006, IEEE, pp. 989-992; (4 pages).

Extended European Search Report dated Jun. 28, 2022 for European Patent Application No. 18941317.2, 9 pages.

Qingping Li et al.; "Visible and Infrared Video Fusion Using Uniform Discrete Curvelet Transform and Spatial-Temporal Information"; Chinese Journal of Electronics, vol. 24, No. 4, Oct. 2015; 6 pages.

Liang Xu et al.; "Infrared-Visible Video Fusion Based on Motion-Compensated Wavelet Transforms"; The Institution of Engineering and Technology (IET) Image Processing, vol. 9, Issue 4, Apr. 2015; 11 pages.

\* cited by examiner

METHOD, SOFTWARE PRODUCT, DEVICE AND SYSTEM FOR INTEGRATING IMAGES

CROSS-REFERENCE TO RELATED APPLICATIONS

This application is a 35 U.S.C § 371 national stage application for International Application No. PCT/SE2018/051225, entitled "A METHOD, SOFTWARE PRODUCT, DEVICE AND SYSTEM FOR INTEGRATING IMAGES", filed on Nov. 28, 2018, the disclosures and contents of which are hereby incorporated by reference in their entireties.

TECHNICAL FIELD

The present disclosure relates to a method for image integration of overlapping multi-source images.

BACKGROUND

Image integration comprises techniques for taking the information contained in a number of input images and creating a new integrated image based on a certain purpose, such as highlighting multiple pieces of important information in a single integrated image. Typically the input images represent the same scene and an integrated image can be formed which contains more relevant information than any individual input image. The input images preferably capture the scene, or generate a model of the scene, using different techniques in order to each contribute with unique information to the integrated image. Input images are preferably captured or created simultaneously if the scene contains moving objects. Input images can be one set of images or part of a continuous stream of real time image sets, such as from video cameras.

The goal in such image integration is to preserve and/or highlight the relevant information in the input images without generating artefacts. A simple form of image integration with grayscale 2D images of the same dimension is based on averaging, e.g., dividing the N input images' pixel values by 1/N and summing the corresponding pixel values to form an integrated image. This concept may be expanded to weigh input images based on source or adding multiple values to each pixel, such as in colour (RGB) images. The input images are in these cases scaled globally.

Another alternative is a locally weighted image integration where each region, or pixel, of an input image is given its own weight. Two groups of locally weighted image integration methods exist, spatial domain image integration methods and transform domain image integration methods. Spatial domain integration methods operate on the pixel values of the input images utilizing techniques such as principal component analysis (PCA) or intensity hue saturation (HIS) transforms. Transform domain image integration methods transform the input images to another domain, such as the Fourier Domain. One example of a transform domain method is image integration based on direct wavelet transforms (DWT).

SUMMARY

One object of the invention is to improve the usability of integrated images.
One object of the invention is to improve the usability of integrated real-time images.
One object of the invention is to improve the usability of integrated images from different sources.
One object of the invention is to integrate images based on multiple criteria.

At least one of the object has in accordance with the present disclosure been achieved by means of a software implemented method for scoring overlapping images to be integrated according to at least one set of criteria and integrating the overlapping images pixel-by-pixel based on the relative scores for the corresponding pixels of the overlapping images. The method comprises the step of acquiring overlapping images with different properties, and forming an integrated image based on the overlapping images. The step of forming an integrated image comprises the step of generating at least one score map per overlapping image with score values based on locally salient features. The step of forming an integrated image further comprises the step of forming an integration map with weight values at least based on the score map of the overlapping images. The step of forming an integrated image further comprises the step of integrating the overlapping images pixel-by-pixel based on the corresponding weight values of the integration map to form the integrated image. The integration of the overlapping images may be in direct proportion to the weight values from the integration map. The sum of weight values for all overlapping images for each individual pixel may be 1, which would satisfy the requirement for image blending. The term image integration refers to any technique wherein at least part of two or more image are combined to form a new image which may include processes such as image blending, image fusion, image melding or image merging.

Thereby the overlapping images may be automatically integrated based on the integration map which is formed by the score maps which in turn are generated based on image properties of particular interest, such as pixel values above or below a certain threshold and/or object recognition and/or differences between local and global histograms.

The invention has the advantage that acquired overlapping images from different sources may be scored differently based on the type of source the image was generated from, such as an IR-camera, computer model or radar device. Overlapping images may be scored multiple times based on different criteria. Thereby, multiple score maps per image may be generated. Images from different sources may also be weighted globally by a user and/or weighted automatically based on image analysis, e.g., decreasing the weights of images from visual cameras under foggy, dark or other low visibility conditions.

The invention also allows for image integration of video images with reduced lag by saving the formed integration maps. Reduced lag may be achieved by using the most recently formed integration map, saved from a previous image integration, allowing the overlapping images to be integrated before their corresponding integration map is formed. The option to use saved integration maps is of particular interest for image integration of multiple sets of overlapping images where the time between image sets is similar to the time required to form an integration map, e.g., 50 milliseconds or 20 overlapping image sets per second.

Video images herein refer to a part of a continuous stream of real-time images from a sensor capturing a scene or a computer model providing computer generated imagery.

Lag herein refers to the time from acquiring overlapping images to forming an integrated image.

Further, the invention also allows for image integration of video images based on temporal changes by saving score maps and integration maps. The method allows for temporal changes, temporal changes being changes between a series of overlapping image sets, to be taken into account by generating score maps and/or forming integration maps based on score maps and/or integration maps saved from previous image integrations.

The invention may also allow the use of saved score maps and/or integration maps to reduce lag if at least two score maps per image are generated and generating the score maps takes different amounts of time. Lag reduction may be achieved by using quickly generated score maps formed based on the overlapping images to be integrated together and using score maps requiring more time to be generated saved from a previous image integration to form the integration map.

In different examples, the step of acquiring overlapping images comprises acquiring at least three overlapping images. The overlapping images may be obtained from a sensor capturing a physical scene, a synthetic viewpoint in a computer model (computer generated imagery), a composite image of the two and/or from a database. A higher number of overlapping images allows for a higher number of different image sources, which may result in an integrated image with more relevant information. Additional images, not to be integrated, and/or sensor data may be acquired and used in the generation of score maps and/or the formation of an integration map.

In different examples, the step of generating score maps comprises generating at least two score maps per overlapping image. The score maps may be generated based on the pixel values in the image and/or local contrast and/or recognized objects and/or differences between local and global histograms and/or other statistical deviations. The overlapping images do not need to be scored using the same scoring criteria. A score map generated based on one overlapping image may influence a consecutive scoring of the overlapping image. The score maps generated based on one overlapping image may influence the scoring of another overlapping image. The option to influence scoring based on previous scoring allows improved detection of interesting regions, e.g., a visual image from a camera sensor is scored based on object recognition of animals, humans and vehicles, this score map influences how an infrared image from an IR camera sensor is scored to prioritize what may be warm animals, humans and vehicles.

In different examples, the step of forming an integration map comprises forming the weight values in the integration map in the direct proportion to the relative values of score map values of the overlapping images for the corresponding pixels. An example of forming integration weights for the corresponding pixels of two overlapping images, A and B: The score map value for the pixel in image A is 0.1 and the score map value for the pixel in image B is 0.3, the normalized relative values are 0.25 for A and 0.75 for B, which may be stored as single weight value, 0.25, in an integration map for two images (where the A weight value is the stored value X and the B weight value is 1−X). The formation of weight values in the integration map based on score map values may be calculated utilizing sigmoidal functions such as the logistic function.

The present disclosure further relates to a computer program for image integration. The computer program comprises routines for performing the method according to the present disclosure. In one example the computer program is an application for image integration in a vehicle display system. In one example the computer program is an application for a man portable device, such as a night-vision device.

The present disclosure further relates to a computer program product. The computer program product comprises a program code stored on a readable data storage medium for image integration. The data storage medium can be non-volatile. The program code is configured to execute the method according to the present disclosure. The computer program product may be running on a CPU of a processing element arranged to receive overlapping images. The computer program product may control an image generation element arranged to provide at least one overlapping image. The controlled image generation element may be arranged to provide real-time images, such as video.

The present disclosure further relates to an image integration device comprising a processing element, wherein the processing element is arranged to acquire overlapping images and integrate said overlapping images according to said method. The processing element may utilize a computer program product to carry out said method. Said camera device may comprise an image generating element arranged to provide overlapping images to the image processing element. Said image integration device may be a part of a navigation system or a display system in a vehicle. Said image integration device may be part of a man portable device, such as a night vision device.

The present disclosure further relates to an image integration system comprising at least one image generating element, a processing element, wherein the at least one image generating element is arranged to provide overlapping images captured from a scene, computer generated imagery, composite images of the two, or image from a database. The processing element is arranged to acquire overlapping images and to integrate said images according to said method. The processing element in the image integration system may be the previously described processing element in the image integration device. The system may comprise at least one display element. The system comprising at least one display element has the capability of performing all steps required to go from capturing a scene with sensors (image generating elements) to presenting the user with an integrated image (display element). Said system may be integrated into a vehicle, such as an aircraft. The system may be a man portable device, such as a night-vision device.

DETAILED DESCRIPTION

Figure 1:
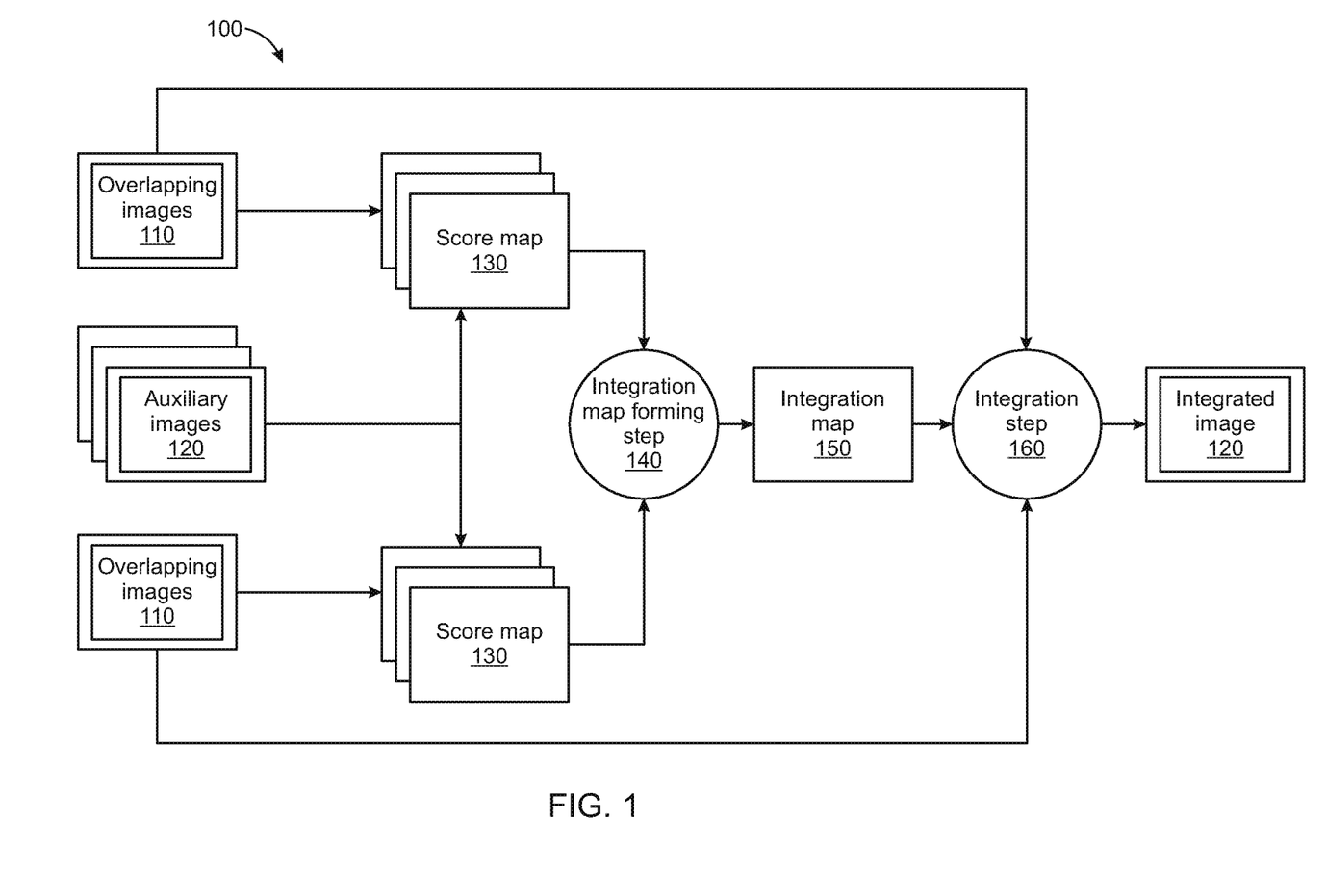
FIG. 1 shows schematically an example of a method for content-aware image integration.

FIG. 1 describes schematically a method 100 for content-aware image integration. The method allows for combining of images from multiple sources based on how high the features and/or regions of said images are scored by algorithms arranged to identify features and/or regions of interest in images from different sources.

The method comprises the steps of acquiring at least two overlapping images 110 having different properties. The number of overlapping images 110 may be larger than two.

Overlapping images 110 may be captured from a physical scene and/or synthetic (CGI) and/or composite. The overlapping images 110 may be a single set or part of a continuous stream of overlapping image sets, such as real-time images and video.

The overlapping images 110 are each scored based on locally salient features to generate a score map 130 for each image 110. The score map 130 may be generated based on an image 110 in the set of overlapping images 110 and at least one auxiliary image 120. When used as an auxiliary image 120 no part of the image 120 is integrated in the image integration step 160.

The number of score maps 130 generated per image 110 may be two or more. The score map 130 may be a heat map that pinpoints regions of interest based on local histograms and global histograms. The score map 130 may be generated based on the absolute values or statistical deviations in a sensor image, such as an IR heat map. The score map 130 may be generated based on object recognition, such as recognition of vehicles and/or light sources and/or runways. The score map 130 may be generated based on a RADAR image containing values such as distance and/or rate of positional change. The set of overlapping images 110 may be scored by different criteria depending on the image source, or type, to each generate at least one score map 130. The score map 130 generation based on an overlapping image 110 may be influenced by a previous score map 130 generated for the same overlapping image 110. The score map 130 generation based on an overlapping image 110 may be influenced by a score map 130 generated for another overlapping image 110 in the same overlapping image set 110.

An integration map 150 is formed in an integration map forming step 140 based on the at least one score map 130 of the at least two overlapping images 110. The integration map forming step 140 may be arranged to allow a weighting of the score maps 130 based on the source of the corresponding overlapping images 110 (not shown). The source based weighting of score maps 130 in the integration map forming step 140 may be user defined or automatically set based on the overlapping images 110 and/or the score maps 130.

The integration map 150 may be a three dimensional matrix with weights for at least two overlapping two-dimensional images 110. The weight values in the integration map 150 corresponding to an image 110 may be directly proportional to the relative values of the corresponding pixels in the at least one score map 130 of the overlapping images 110. The relationship between relative score map 130 pixel values and integration map 150 weight values may be non-linear, such as a relationship based on a sigmoidal function. The integration map 150 weight values may be normalized such that every pixel-by-pixel sum of weights in integration maps 150 is a constant value, such as 1.

In an integrating step 160 the images 110 are integrated based on the integration map 150 to create an integrated image 170. The values in the integration map 150 relate to the contribution of the overlapping images 110 to each weight of the integrated image 170. The integration step 160 may integrate the overlapping images 110 pixel-by-pixel in direct proportion to the corresponding weight values in the integration map 150 to create the integrated image 170.

Figure 2:
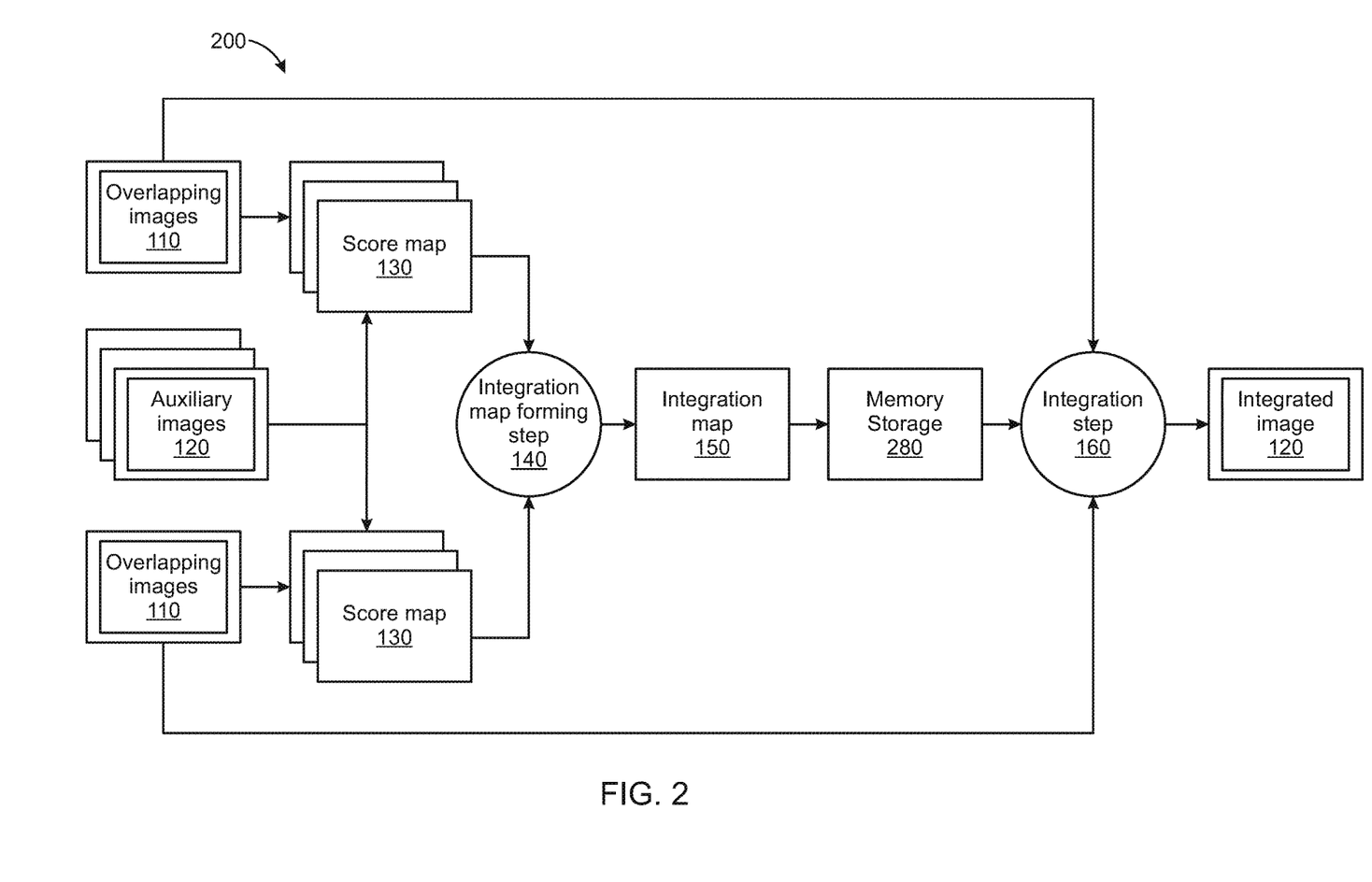
FIG. 2 shows schematically an example of a method for lag-free real-time image integration.

FIG. 2 shows schematically a method 200 for reduced-lag image integration of at least two sets of at least two real-time images. The reduced-lag image integration method 200 comprises at least some of the features of the method 100 described in FIG. 1. The method 200 uses an integration map memory storage 280 arranged to receive, store and provide integration maps 150. In the method 200 for reduced-lag image integration the acquired set of overlapping images 110 can instantly be integrated using the most recently stored integration map 150 in the integration map memory storage 280. The arrangement with a memory storage 280 for the integration maps 150 is advantageous in real-time image integration, such as integrating images captured with video cameras, where the time interval between sets of overlapping images 110 may be on the same order of magnitude as the time required to calculate the integration map 150.

A reduced-lag integrating step 240 may be set to a mode to either integrate the overlapping images 110 using the most recently stored integration map 150 or wait for the corresponding integration map 150 to be formed. The reduced-lag integrating step 240 mode may be user set or set automatically. The reduced-lag integrating step 240 mode may be set automatically based on the score maps 130 and/or integration maps 150 of previous overlapping image sets 110. The reduced-lag integrating step 240 mode may be set to select mode depending on if the most recently stored integration map is older than a predetermined amount of time, e.g., to only use the stored integration map 150 if it was formed less than 25 milliseconds ago.

Figure 3:
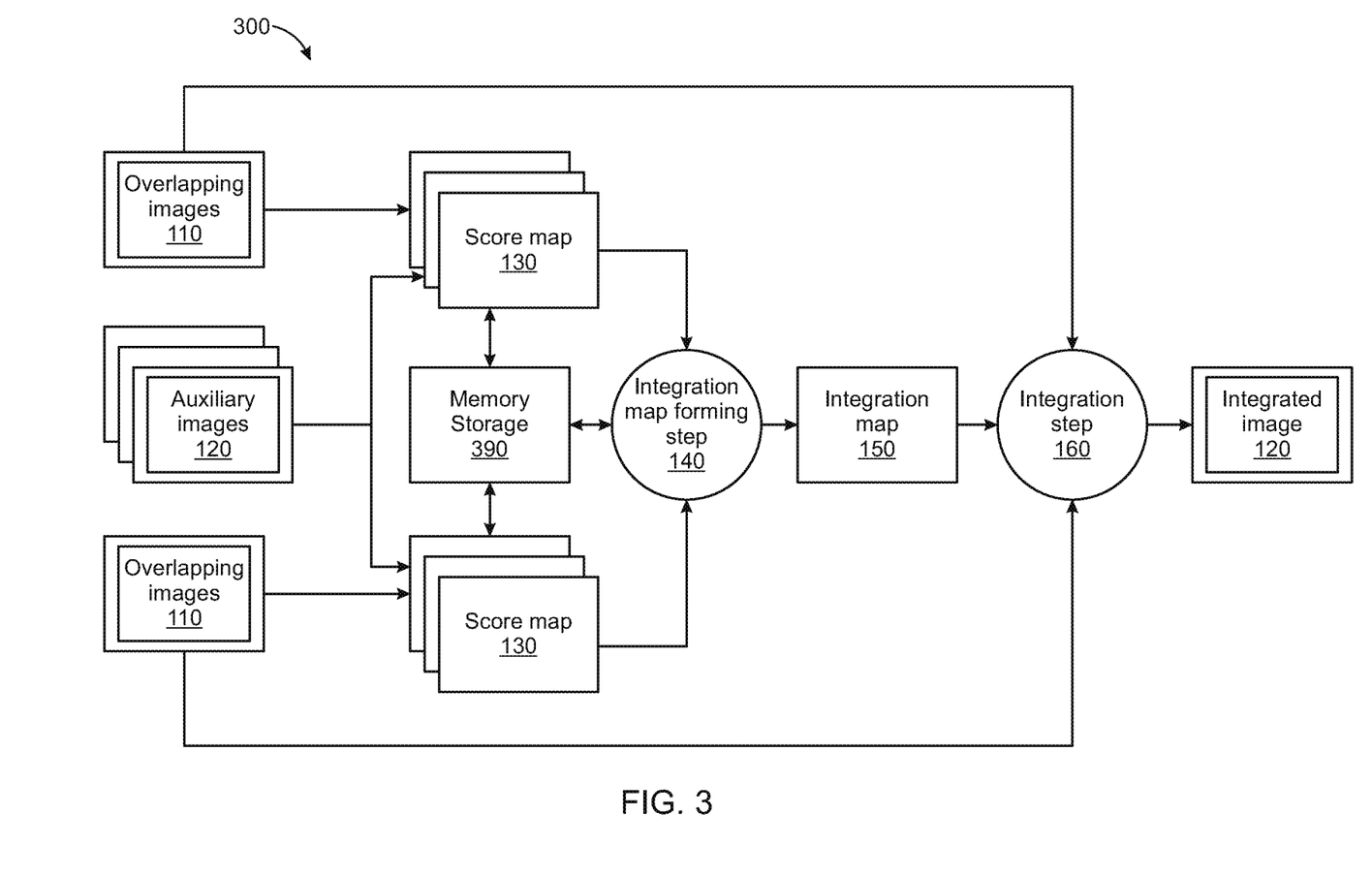
FIG. 3 shows schematically an example of a method for image integration with temporal hysteresis.

FIG. 3 shows schematically a method 300 for image integration with temporal hysteresis factored into the generation of score maps 130 and/or formation of an integration map 150. The temporal hysteresis based image integration method 300 comprises at least some of the features of the method 100 described in FIG. 1. The method further uses a map memory storage 390 arranged to receive, store and provide score maps 130 and/or integration maps 150.

The score maps 130 stored in the map memory storage 390 may be used for generating subsequent score maps 130 and/or forming subsequent integration maps 150. With at least two types of score map 130 per overlapping image 110 the score maps 130 of the type requiring the most time to calculate may be stored and used together with the subsequent score map 130 of the type requiring the least amount of time to calculate for forming an integration map 150. The option to selectively store the calculation intensive score maps 130 for use together with the easier to calculate score maps 130 in subsequent image integrations may result in lag reduction. The integration map 150 stored in the map memory storage 390 may be used for generating subsequent score maps 130 and/or forming subsequent integration maps 150.

The arrangement with a map memory storage 390 is advantageous in real-time image integration, such as integrating images captured with video cameras, in situations where small changes are expected between consecutive sets of overlapping images 110. The arrangement with a map memory storage 390 allows for temporal activity as well as spatial activity to be factored into the generation of score maps 130 and/or formation of integration maps 150.

For overlapping real-time image sets 110, such as images from video cameras, the method may use a moving average of the most recent integration maps 150 to generate an integration map 150. The map memory storage 390 may be set to not provide score maps 130 and/or integration maps 150 if the most recently stored score maps 130 and/or integration map 150 are older than a predetermined amount of time. The method for 200 reduced-lag image integration may be combined with the method 300 for image integration with temporal hysteresis.

Figure 4:
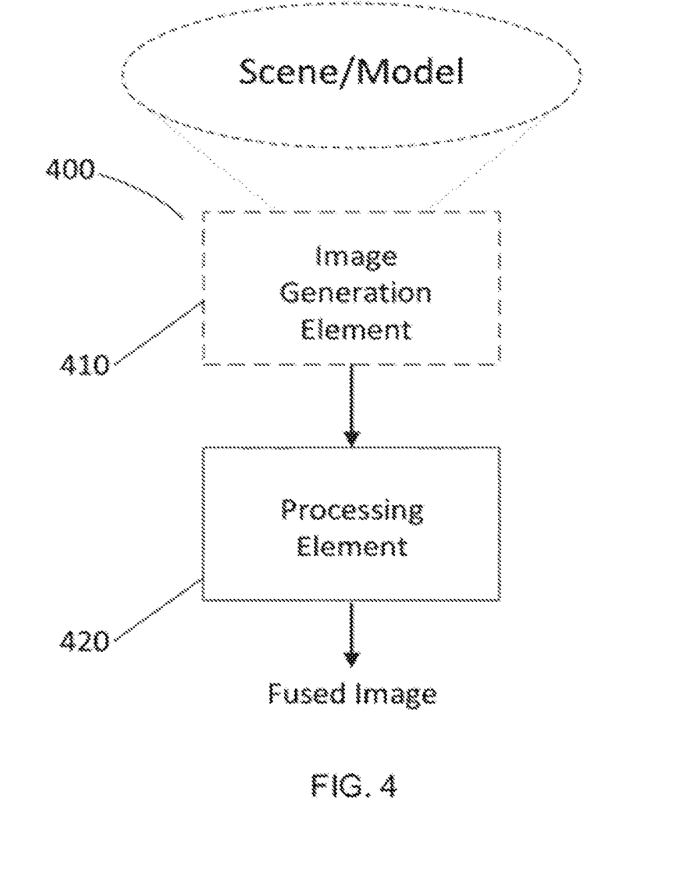
FIG. 4 depicts schematically an example of a device for content-aware image integration.

FIG. 4 depicts schematically a device 400 for content-aware image integration comprising a processing element 420. The device may be arranged carry out at least one of the steps described in FIG. 1 and/or FIG. 2 and/or FIG. 3. The device may comprise at least one image generation element 410.

The at least one image generation element 410 is arranged to provide images to the processing element 420. At least one image generation element 410 may be a visual camera, IR-camera or UV-camera. At least one image generation element 410 may be a video camera or similar device providing real-time images to the processing element. Images provided by the image generation element 410 may be images captured from a physical scene and/or a synthetic image (CGI) and/or a composite of the two and/or from a database. At least one image generation element 410 may be a computer running software to form a model providing synthetic perspective view images of said model.

The processing element 420 is arranged to acquire and store the images provided by the image generation element 410, carry out the steps of the disclosed method with a computer program and provide the resulting integrated image 170. The processing element 420 may be a computer with an image integration software product on a non-volatile memory arranged to carry out the disclosed method.

The device 400 may be integrated into the navigation system of a vehicle. The device 400 may be integrated into the display system of a vehicle. The device 400 may integrated into an unmanned aerial vehicle. The device 400 may be an unmanned aerial vehicle. The device 400 may be integrated into a man portable device, such as a night-vision device.

Figure 5:
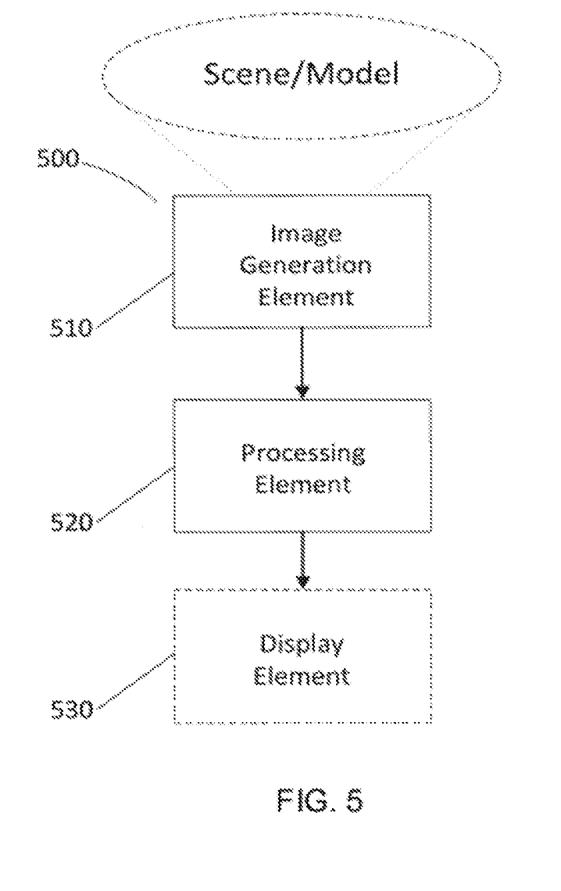
FIG. 5 depicts schematically an example of a system for content-aware image integration.

FIG. 5 depicts schematically a system 500 for content-aware image integration comprising an image generation element 510 and a processing element 520. The system may be arranged carry out at least one of the steps described in FIG. 1 and/or FIG. 2 and/or FIG. 3. The system 500 may comprise at least one display element 530.

The at least one image generation element 510 provides overlapping images 110 for the processing element 520. An image generation element 510 may capture images from a physical scene, create synthetic images from a computer model, create composite images based on both a computer generated model and a physical scene, or provide images from a database. The image generation element 510 may be the same type of image generation element 410 as in FIG. 4 previously described. The processing element 520 is arranged to acquire and store the images provided by the image generation element 510, carry out the steps of the disclosed method by executing a computer program running on a CPU and provide the resulting integrated image 170.

The processing element 520 may be same type of processing element 420 as in FIG. 4 previously described. At least one display element 530 may be arranged to acquire the integrated images provided by the processing element 520. At least one display element 530 may be a segment display, computer monitor, head-up display (HUD), head-mounted display (HMD) or volumetric display. The system 500 may be integrated into a vehicle, such as an aircraft. The system 500 may be a man portable device, such as a night-vision device.

The system 500 may comprise at least one communication element (not shown) arranged to transfer data between at least one image generation element 510 and/or processing element 520 and/or at least one display element 530. The at least one image generation element 510 and/or processing element 520 and/or at least one display element 530 may be in physically separate locations. The individual elements of the system 500 may be installed into at least one vehicle and/or at least one fixed point of communication arranged to communicate wirelessly via at least one communication element.

The invention claimed is:

1. A method for image integration, said method comprising:
    acquiring at least two overlapping images having different properties, and
    forming at least one integrated image based on the overlapping images, wherein forming at least one integrated image comprises:
    generating at least one score map for each acquired overlapping image relating to locally salient features of said overlapping image,
    forming an integration map based on the at least one score map of the at least two overlapping images,
    storing the formed integration map, and
    integrating the at least two overlapping images based on the integration map to form at least one integrated image,
    thereafter, repeatedly performing the operations above, wherein forming the at least one integrated image comprises:
    integrating the at least two overlapping images based on a most recently stored integration map to form the integrated image, and
    wherein the most recently stored integration map is formed based on previously acquired overlapping images.

2. The method of claim 1, wherein the method further comprises:
    storing the generated score maps,
    thereafter, repeatedly performing the operations above wherein at least one score map is generated and/or the integration map is formed based on at least on previously stored score map generated based on previously acquired overlapping images.

3. The method according to claim 1, wherein the integration map is a pixel-based integration map and wherein the at least two overlapping images are integrated on a pixel by pixel level.

4. The method according to claim 1, wherein weight values in the integration map are directly proportional to the corresponding pixel values in the score maps.

5. The method according to claim 1, wherein integrating the at least two overlapping images to form the at least one integrated image is based on the most recently stored integration map when said stored integration map age is below a predetermined amount of time or based on the integration map formed based on the current acquired overlapping images.

6. The method according to claim 1, wherein the overlapping images are integrated pixel-by-pixel in direct proportion to the corresponding weight values in integration map to create the integrated image.

7. The method according to claim 1, wherein a number of overlapping images is at least three, and/or wherein a number of generated score maps per image is at least two.

8. The method according to claim 1, wherein at least one of the overlapping images is computer-generated imagery, and/or wherein at least one of the at least two overlapping images is a real-time image.

9. The method according to claim 1, wherein the integration map is stored and used to generate score maps in a subsequent image integration, and/or wherein the score map generation relating to locally salient features comprises scoring based on object recognition.

10. The method according to claim 1, wherein the score map generation relating to locally salient features comprises scoring based on local histograms and global histograms.

11. An image integration device comprising:
an integration map memory storage arranged to receive, store and provide integration maps, and
a processor configured to repeatedly receive at least two overlapping images, and
form at least one integrated image based on the overlapping images, wherein the forming of at least one integrated image comprises:
generating at least one score map for each acquired overlapping image relating to locally salient features of said overlapping image,
forming an integration map based on the at least one score map of the at least two overlapping images,
storing the formed integration map on the integration map memory storage, and
integrating the at least two overlapping images using the most recently stored integration map to form an integrated image, wherein the most recently stored integration map is based on previously acquired overlapping images from a previous image integration.

12. The image integration device of claim 11, further comprising:
storing the generated score maps on the map memory storage,
wherein at least one score map is generated and/or the integration map is formed based on at least on previously stored score map generated based on previously acquired overlapping images.

13. The image integration device according to claim 11, further comprising at least one camera device arranged to obtain the overlapping images, and/or wherein the at least one camera device is arranged to provide real-time images.

14. A display system of a vehicle comprising an image integration device according to claim 11.

15. A vehicle navigation system comprising an image integration device according to claim 11.

16. An unmanned aerial vehicle system comprising an image integration device according to claim 11.

17. An image integration system comprising:
at least one camera device,
an integration map memory storage arranged to receive, store and provide integration maps, and
a processor,
wherein the at least one camera device is arranged to provide overlapping images to the processor, and
wherein the processor is arranged to format least one integrated image based on the overlapping images, wherein the forming of at least one integrated image comprises:
generating at least one score map for each acquired overlapping image relating to locally salient features of said overlapping image,
forming an integration map based on the at least one score map of the at least two overlapping images,
storing the formed integration map on the integration map memory storage, and
integrating the at least two overlapping images using the most recently stored integration map to create an integrated image,
wherein the most recently stored integration map is based on previously acquired overlapping images from a previous image integration.

18. The image integration system of claim 17, further comprising:
storing the generated score maps on the map memory storage,
wherein at least one score map is generated and/or the integration map is formed based on at least on previously stored score map generated based on previously acquired overlapping images.

19. The image integration system according to claim 17, further comprising at least one display, wherein the image integration system is arranged to transfer data between the camera device and/or the processor and/or the display.

20. The image integration system according to claim 17, wherein at least part of the system is integrated into an aircraft.

* * * * *